Oct. 5, 1965 N. M. NILSSON ETAL 3,209,758
THRESHING MACHINE FOR LEGUMINOUS PLANTS, PARTICULARLY PEAS
Filed Nov. 16, 1962 6 Sheets-Sheet 5
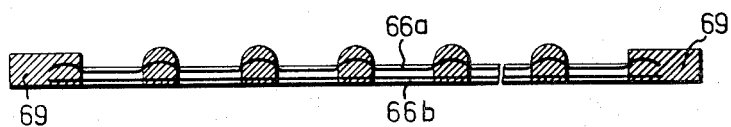
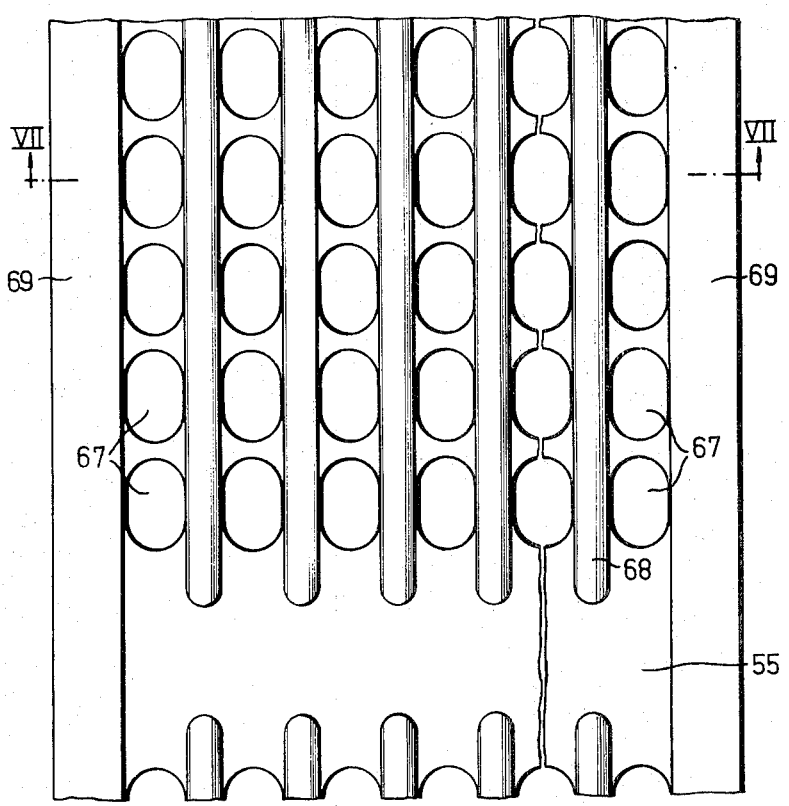

United States Patent Office 3,209,758
Patented Oct. 5, 1965

3,209,758
THRESHING MACHINE FOR LEGUMINOUS
PLANTS, PARTICULARLY PEAS
Nils Malte Nilsson, Klippan, Torsten Lennart Rixman, Landskrona, and Gustav Hjalmar Möller, Trelleborg, Sweden, assignors to Aktiebolaget Rix-Maskiner, Klippan, Sweden, a corporation of Sweden
Filed Nov. 16, 1962, Ser. No. 238,205
Claims priority, application Sweden, Nov. 17, 1961, 11,452/61; Jan. 16, 1962, 445/62
4 Claims.  (Cl. 130—27)

This invention relates to a threshing machine for leguminous plants, particularly peas, comprising between a point of supply for vines to be threshed and a point of delivery for threshed vines a row of cylinders carrying beaters and adapted to be rotated in the same direction about substantially parallel and horizontal shafts which extend transversely of the direction of conveyance for the vines between the supply point and the delivery point.

The object of the invention is to provide a threshing machine for leguminous plants, particularly peas, which has a greater capacity per unit of weight than the threshing machines now predominating on the market. These threshing machines include a perforated outer cylinder and a rotatable inner cylinder coaxial therewith and carrying beaters, the vines being conveyed, in a firmly compacted state, axially through an annular space between the cylinders during the threshing operation.

Another object of the invention is to provide a threshing machine which is more reliable in operation than these prior-art threshing machines in which the holes in the perforated outer cylinder are easily clogged, for which reason the threshing machine has to be stopped for cleaning or exchange of perforated metal sheets.

According to thee invention, a threshing machine for leguminous plants, particularly peas, of the type outlined in the foregoing is characterized by the fact that stationary concaves are disposed above the threshing cylinders for cooperation therewith and that a carrying run of a perforated endless belt conveyor is arranged beneath said threshing cylinders and extends along the row of cylinders with its upper face situated close to the cylinders in a plane substantially parallel with the shafts of said cylinders.

These objects of the invention and the advantages thereof will become apparent from the following description made with reference to the accompanying drawings in which:

FIG. 6 is an enlarged plan view of a portion of the perforated conveyor of the threshing machine;

FIG. 7 is a cross-sectional view on line VII—VII in FIG. 6;

Figure 1:
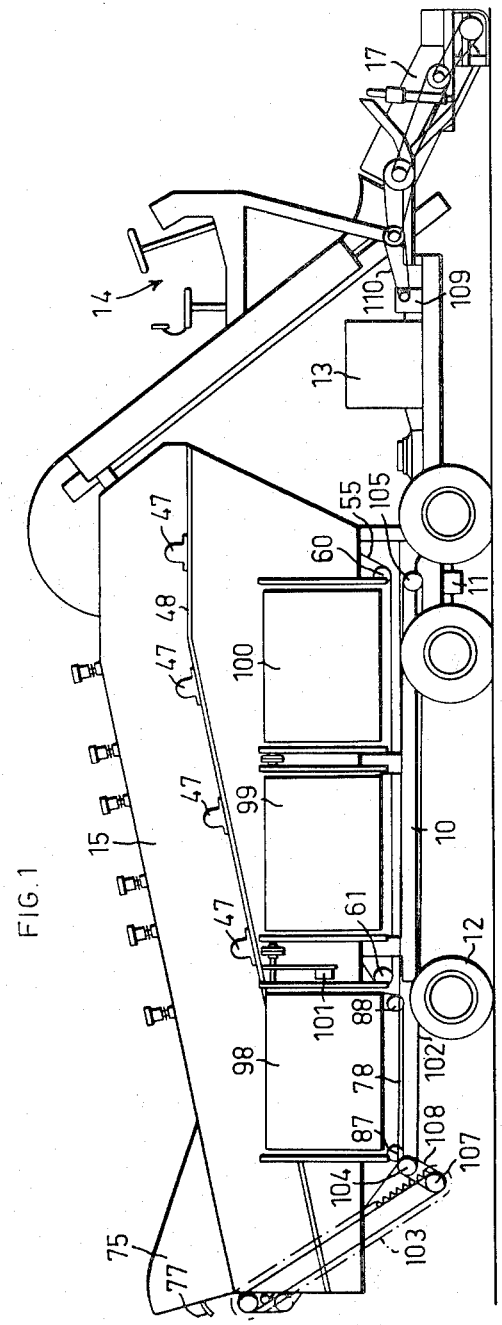
FIGS. 1 and 2 are side elevational views of a threshing machine for peas as viewed from opposite sides.

The threshing machine illustrated in the drawings comprises a rigid mobile chassis 10 which is supported by a two-axle truck 11 and a pair of wheels spaced rearwardly from said truck. The wheels of the truck are driven by an internal combustion engine 13 and the wheels 12 are steerable from the driver's seat 14. The threshing machine illustrated is thus self-propelling and can easily be driven and steered also on wet grounds such as stiff clay soil.

Figure 2:
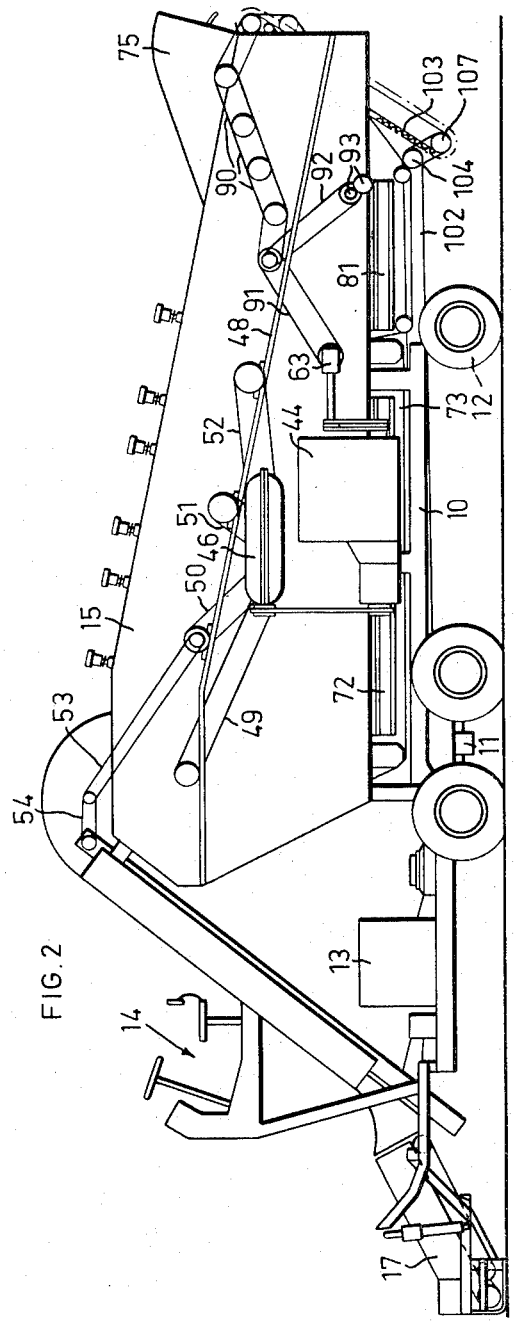
Figure 3:
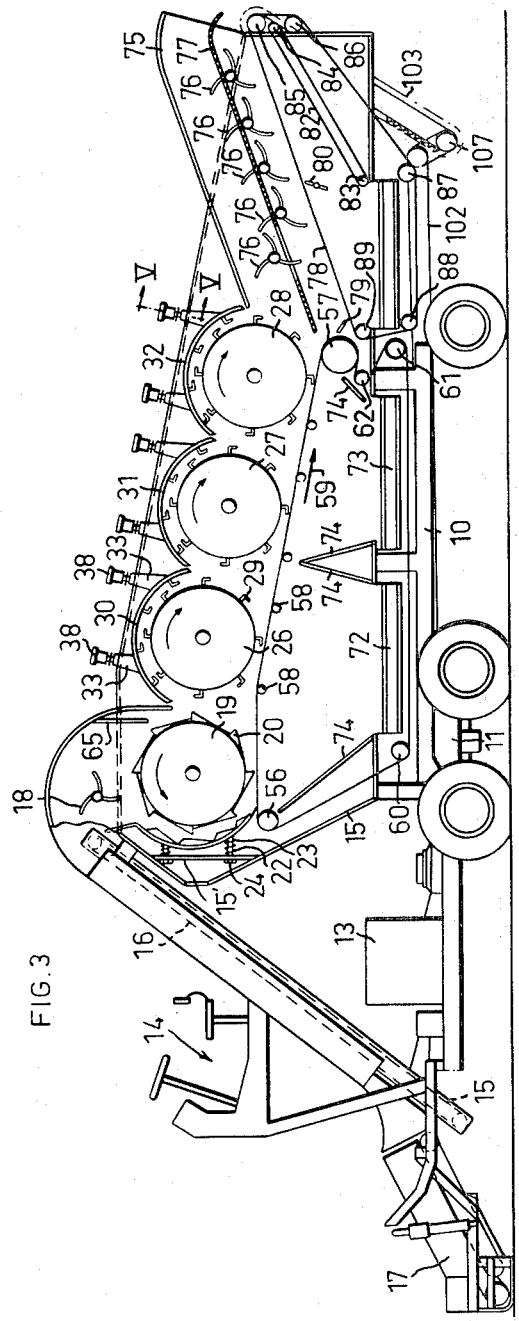
FIG. 3 is an inside elevational view of the threshing machine, partly in vertical cross section.

A box-like superstructure 15 is erected on the chassis 10. It consists of strong sheet steel and is made rigid by means of external flanges and webs (not shown). Mounted on the chassis and the superstructure in the front end of the threshing machine, the right-hand end in FIG. 1 and the left-hand end in FIGS. 2 and 3, is an endless belt conveyor 16 which extends from a pick-up device 17 arranged at ground level and coupled with the chassis 10 to convey cut vines lying in swaths on the ground up to a supply point. A batch feeder 18 is located at said supply point. It is substantially in the form of a rotatably mounted impeller which divides up the supplied continuous vine strand into batches which are then individually fed into the interior of the threshing machine. A horizontal feed cylinder 19 is mounted for rotation substantially directly beneath the batch feeder 18 and adapted to be rotated by means of a device described in the following in a clockwise direction, as indicated by an arrow in FIG. 3. The cylinder 19 has its circumference provided with sheet metal profile members 20 forming axial ribs of saw-toothed cross section which has a substantially radial front boundary surface, as viewed in the direction of rotation of the cylinder, and a rear boundary surface inclined thereto. These ribs primarily serve to carry along the supplied vines but are also adapted, in cooperation with a concave 21 associated with the feed cylinder to provide a preliminary threshing of the vines. Said concave is displaceably mounted by means of rods 22 in a portion 15' of the superstructure 15 and is biased by springs 23 on said rods 22 toward the feed cylinder 19 to a normal position determined by heads 24 on said rods 22. Said concave 21, however, is displaceable from said normal position against the action of the springs 23 in order to be able to yield if stones accompany the vines into the gap between the feed cylinder and its concave, or if too much vines enter this gap because of irregular feed; otherwise the peas could be crushed in the latter case. The concave also is provided with ribs 25 which are facing the feed cylinder 19 and are constituted by sheet metal profile members.

Figure 5:
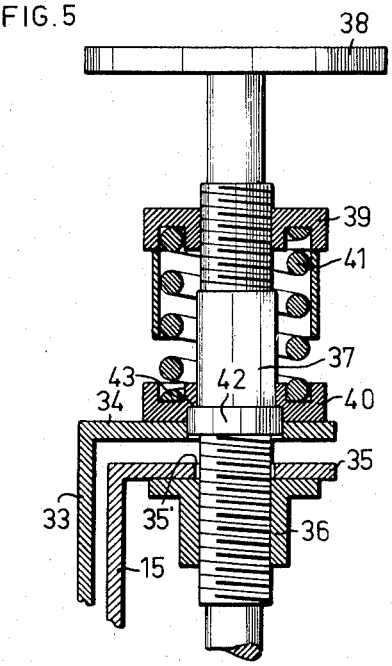
FIG. 5 is a transverse cross-sectional view of a detail on a larger scale, substantially on line V—V in FIG. 3.

A row of threshing cylinders of identical design are disposed in the superstructure 15 beyond the feed cylinder 19. Said threshing cylinders are rotatable about shafts which are parallel with the shaft of the feed cylinder 19 and lie in a plane inclining downwardly from the feed cylinder 19 longitudinally of the cylinder row. The threshing cylinders are adapted to be rotated in the opposite direction to the feed cylinder by means of devices to be described in the following. The cylinders are three in number and designated 26, 27 and 28. With reference to the cylinder 26, said three cylinders are equipped with beaters in the form of axially extending angular profile members 29 which have a flange projecting substantially radially from the cylinder, and at the outer end of said flange a second flange is bent in the intended direction of rotation of the cylinder. Three concaves 30, 31, 32 each associated with one of the threshing cylinders are also of identical design and provided with angular profile members of the same shape and arrangement as the angular profile members on the threshing cylinders 26–28. The concaves 30–32 are mounted in the superstructure in the same individual manner and the details of the mounting will appear from FIG. 5. On the upper side each cancave has at each end a pair of arms 33 which extend along the inner side of the adjoining longitudinal side wall of the superstructure 15 upwards over the top edge of said side wall and at the upper end said arms have an outwardly bent end portion 34 which is located above an outwardly bent upper marginal portion 35 of the side wall, said marginal portion having at its underside an internally threaded sleeves 36. A screw sprindle 37 is passed through a hole 35' in the marginal portion 35 and screwed into the sleeve 36 from above. At the upper end said screw spindle has a handwheel 38. A pressure coil spring 41 wound about the screw spindle is arranged between a ring 39 screwed onto said spindle and an annular abutment 40 secured to the bent end portion 34. Said pressure spring 41 holds the arm 33 and as a consequence the associated concave urged downwards into a normal position determined in that an annular flange 42 on the screw spindle bears against a shoulder 43 in the abutment 40. The spring force can be regulated by screwing the ring 39 on the spindle, and the position of the concave can be regulated in that the spindle is screwed in the sleeve 36. The concaves can thus be raised from normal position against their own weight and the tension of the springs 41 in order to be able to yield in the same way as the concave 21. In normal position the distance between the concave and the associated cylinder successively decreases in the direction of rotation of the cylinder. Preferably, the cylinders and concaves are provided with a hard rubber coating the degree of hardness of which becomes higher, as viewed from the first to the last cylinder, in order that the peas in the threshing operation effected by the first cylinder may be subjected to the gentlest treatment in that the most developed and thus softest and most readily shelled peas are separated in this cylinder while the harder and more difficultly shelled peas retain themselves longer in the vines according as the latter are transferred from one threshing cylinder to the other, in a manner to be described in the following. The cylinders 19 and 26–28 rotate in synchronism with each other and with the impeller 18 by the action of an internal combustion engine 44 which is carried by the chassis 10 and coupled to a distribution gear box 46 over a chain transmission 45. The shafts of the cylinders 19 and 26–28 and that of the impeller 18 project onto the outer side of the superstructure 15, and the shaft bearings 47 of the cylinders are placed on a projecting flange 48 on the superstructure 15. The shafts of the cylinders are connected by means of chain transmissions 49, 50, 51 and 52 with the distribution gear box 46 while the shaft of the impeller 18 is driven by a chain transmission 53 from the shaft of the cylinder 26 in order to be in turn coupled with the conveyor 15 by means of a chain transmission 54. The feed cylinder 19 can be driven for instance at 140 r.p.m. at a degree of ripeness equal to 100 while the threshing cylinder 26 preferably has a 10 to 15 percent higher r.p.m. than does the feed cylinder 19, and the threshing cylinders 27 and 28 preferably have a 15 to 20 percent higher r.p.m. than does the cylinder 26.

An endless perforated rubber-cloth conveyor 55 is arranged to cooperate with the cylinders 19 and 26–28 and has a run travelling between return pulleys 56 and 57 and extending along the row of cylinders 19 and 26–28 with its upper face close to the beaters thereof and in planes parallel with the shafts of the cylinders. The said run of the conveyor 55 is supported by supporting rollers 58 mounted in bearings which are not shown in detail but are disposed on the inner side of the superstructure side walls and are adjustable into different height positions to allow adjustment of the position of the conveyor run relative to the cylinders. Conveyor 55 is driven in such a direction that the run between the return pulleys 56 and 57 moves in the direction of the arrow 59, i.e., from the left to the right in FIG. 3. Conveyor 55 is otherwise passed over return pulleys 60, 61 and 62. All return pulleys are mounted in bearings carried by the superstructure 15 in a manner not shown in detail, and the conveyor is driven over return pulley 57 the shaft of which projects onto both sides of the superstructure and is coupled on one side (FIG. 2) to the engine 44 over a miter wheel gearing 63 and a chain transmission 64.

Threshing cylinders 26–28 are encased by the superstructure 15 and the concaves 30–32, and the conveyor run extending between return pulleys 56 and 57 forms the bottom of the space accommodating the cylinders. As a result of this encasing there is produced through the rotation of the cylinders an excess pressure in said space which is partly equalized in that the holes in conveyor 55 are in communication with the atmosphere. The vine batches coming from the impeller 18 fall onto feed cylinder 19 slightly to the right of the center thereof, and in order that the vine batches may not be blown away from the feed cylinder by the air stream produced by the rotation of said cylinder, a flexible curtain formed by a depending rubber cloth 65 is disposed above cylinder 19 on that side of the axis of rotation thereof which is opposed to the concave, precisely at the point where the vine batches are supplied so that these batches are gently received by the air stream. The vines are carried along by the ribs of feed cylinder 19 and moved into the space between concave 21 and cylinder 19 where the vines are thrown against the ribs 25 of the concave under distribution and threshing of the most developed and thus most readily shelled peas which together with some vines fall onto conveyor 55 whereupon the peas pass through the latter for continued treatment in the threshing machine in the manner to be described in the following. The vines falling onto conveyor 55 are carried along by the beaters 29 of threshiing cylinder 26, but the greater part of the vines is thrown by cylinder 19 directly against threshing cylinder 26 the beaters 29 of which grasp said vines and move them into the gap between cylinder 26 and the associated concave 30. The reversal of the movement of the vines caused by the different directions of rotation of cylinders 18 and 19 facilitate the separation of the already threshed peas from the vines. Cylinder 27 then takes care of the vines—after a new reversal of direction—and forwards them after further threshing to cylinder 28 which receives the vines after a new reversal of direction. After final threshing between cylinder 28 and concave 32 the vines are discharged from the row of cylinders. The vines are thus conveyed by cylinders 19 and 26–28 from the left end of the row of cylinders, as viewed in FIG. 3, in the direction of the arrow 59 under ever increasing threshing of the vines. The peas shattered from the vines fall through the holes in the perforated conveyor 55, which is promoted by the pressure difference prevailing between the two faces of conveyor 55 by reason of the rotation of the cylinders. Before a detailed description of the means for collecting the peas is entered upon, a suitable form of the conveyor 55 will first be described with reference to FIGS. 6–9.

The conveyor 55 illustrated in FIGS. 6–9 in the drawings comprises a rubber cloth with reinforcing fabric plies 66a and 66b, an upper and a lower one, of polyamide or polyester fibers. The cloth has elongated holes 67 provided therein for allowing the peas to pass therethrough, said holes being arranged in longitudinal rows. Longitudinal rubber strips or ribs 68 are arranged between the rows of holes 67 on one face of the cloth, viz. the side constituting the upper face in the carrying run of conveyor 55 between return pulleys 56 and 57. Said rubber strips or ribs 68 have rounded upper edges in order that the peas falling onto them may not be cut in half when striking the ribs. The bases of the ribs extends up to the edges of the holes 67. As will appear from FIG. 7, the upper reinforcing fabric ply 66a reaches up into the ribs. The other face of the cloth is entirely smooth. At the longitudinal margins which are parallel with the ribs 68, the cloth has marginal beads 69 of rubber, the fabric plies 66a and 66b terminating short of the longitudinal margins of the cloth so that their corresponding side edges are entirely embedded in the marginal beads, which will prevent the fabric plies from fraying in the side edges or the cloth having said fabric plies from splitting along its margins when the cloth is in use. The ribs 68 and the beads 69 are preferably integral with the rubber of the cloth.

It should be stressed particularly that the height of the rib 68 must not be so great that large valuable pods with large peas therein can remain lying between the ribs without being reached by the threshing cylinder beaters 29 which operate above and close to the ribs. Their height should, however, be so small that such pods are carried along by the beaters, whereas thin inferior pods containing small peas or being devoid of peas may very well remain lying between the ribs to be carried away on the conveyor as worthless.

The longitudinal ribs 68 serve to urge the peas down through the holes 67. It has been found that if the upper face of the conveyor is entirely smooth the peas avoid rolling through the holes and follow instead the portions of the rubber cloth lying between the holes and which must of necessity be of a certain minimum width in order that the conveyor may have the requisite strength and may be able to withstand both the load of the peas to be separated and the traction exerted on the conveyor for its operation. This phenomenon seems to be due to the fact that the sap pressed out of the supplied vines during threshing will produce so great an adhesion between the surface of the conveyor and the peas rolling thereon that the latter are retained on the conveyor surface with the possibility of rolling along it and cannot liberate themselves by their own weight from said adhesion. The ribs 68 eliminate this drawback and besides impart an increased stiffness to the cloth longitudinally thereof.

Figure 8:
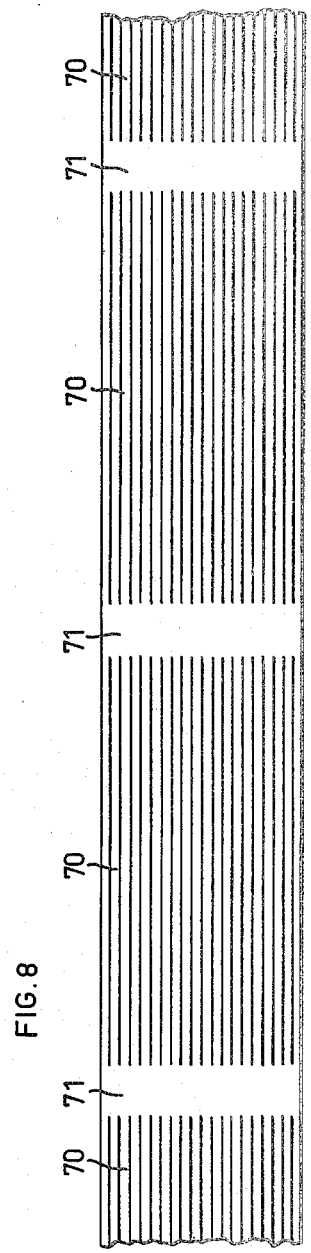
FIG. 8 is a schematic plan view, on a smaller scale, of a greater length of a conveyor according to the invention.
Figure 9:
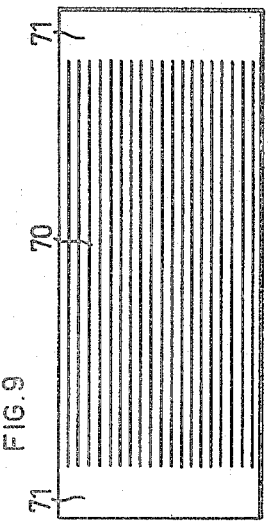
FIG. 9 is a plan view on the same scale as FIG. 8 and shows a connecting piece for the conveyor in FIG. 8.

In the transverse direction, however, the ribs 68 have but an insignificant, if any stiffening effect. As a consequence there is a tendency of the cloth transversely contracting towards its middle when it is subjected during use to the traction necessary for its operation by the return pulley 57. To eliminate this drawback the holes 67 and the ribs 68 are arranged in groups 70 mutually separated by smooth portions 71 which are devoid of both holes and rib (FIG. 8). Each group may have a length of e.g., 2 m., and the groups may be mutually separated by smooth portions having a length of 50 mm., the ribs preferably being of decreasing height over a distance of 30 mm. at each end to gently merge with the smooth portions 71. Said smooth portions, however, serve a further purpose in addition to rigidifying the cloth transversely; they make it possible to connect up the cloth should it have torn and therefore be necessary to interpose an entirely new length in the cloth, while the remaining cloth—where it is formed with holes and ribs— does not present sufficiently large smooth surface portions for placing connecting rivets. The smooth portions 71 are preferably formed, for this purpose, with a pair of transverse rows of rivet holes in the manufacture simultaneously as the holes 67 are punched, since it may prove difficult to make these rivet holes afterwards, in the connecting operation, at exact right angles with the longitudinal margins of the cloth. If the rows of rivet holes do not make right angles with the longitudinal margins the cloth will be pulled askew when used in the threshing machine so that the cloth risks to be torn again. Connecting pieces of the appearance shown in FIG. 9 can be used to connect up the cloth so designed. These connecting pieces comprises a cloth length including a portion 70 with a portion 71 at each end.

The means for the further treatment of the shelled peas and of the vines substantially freed from peas can be provided in many different forms, with application of designs generally employed in the conveying technique, and in view of this they will be but briefly described here.

A pair of endess belt conveyors 72 and 73 operating transversely of the machine are disposed beneath the run of conveyor 55 travelling between the return pulleys 56 and 57, and stationary metal sheets 74 direct the downwardly falling peas onto said belt conveyor. The vines leaving the last threshing cylinder 28 may contain a number of useful shelled peas which are retained in the vines, and for the collection of these peas the vines are discharged from the threshing machine through a shaft 75 at the rear end of the machine in that the vines are worked by rotary spiders 76 on a perforated metal sheet 77, the rotary spiders passing through slots in said sheet. An inclined perforated belt conveyor 78 receives the peas falling from the metal sheet 77 and is directed obliquely upwardly towards the rear end of the threshing machine. The peas pass through the holes in the conveyor 78 while the impurities accompanying them are discharged by said conveyor at the rear end of the threshing machine. A metal sheet 79 prevents the peas from rolling off the conveyor 78 at the lower end thereof, and preferably a rotary member 80 is arranged to vibrate the supporting run of the conveyor 78, which will facilitate the separation of the peas from the impurities accompanying them. The peas fall onto a conveyor 81 which is constructed and arranged in the same manner as conveyors 72 and 73, or onto an endless belt conveyor 82 which from the rear end of the threshing machines inclines downwardly toward conveyor 81 and transfers the peas to it. Conveyor 82 passes over return pulleys 83 and 84 while conveyor 78 passes over return pulleys 85, 86, 87, 88, 89 and embraces both conveyor 81 and conveyor 82. From miter wheel gearing 63 (FIG. 2) the rotary spiders 76 coupled together by chain transmissions 90 are driven over a chain transmission 91. From the first rotary spider 76 the return pulley 83 of conveyor 82 is driven over a chain transmission 92 and a reversing gearing 93, and from the last rotary spider 76 the return pulley 85 of conveyor 78 is driven over a chain transmission 94.

Figure 4:
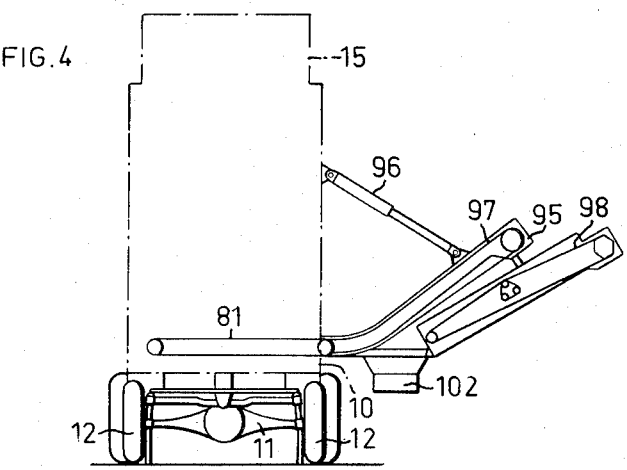
FIG. 4 is a partly schematic rear elevational view of the threshing machine.

Mounted on one side of the threshing machine is a frame 95 which extends obliquely upwardly and outwardly from the chassis 10 and his its lower end connected with said chassis to swing about an axis extending longitudinally of the threshing machine. Frame 95 is stayed in respect of the superstructure 15 by a hydraulic jack 96 which permits pulling in the frame toward the superstructure into a more steeply inclined position, which is desirable when the threshing machine is transported from one field to another. Frame 95 carries three endless belt conveyors which constitute extensions of or connect up each to one of conveyors 72, 73 and 81, and one of said three endless belt conveyors is shown at 97 in FIG. 4. It is associated with conveyor 81. Frame 95 further carries three vibrating conveyors 98, 99 and 100 of the endless belt type, the conveyor 98 being located beneath conveyor 97 to receive the material discharged at the upper end thereof, while conveyors 99 and 100 are situated in a corresponding manner beneath the other two conveyors which correspond to conveyor 97 but are not shown in the drawings. On the vibrating conveyors 98, 99 and 100 the peas are separated from the impurities in that the peas roll down toward the lower ends of the conveyors, while the impurities are discharged at the upper ends thereof. Conveyor 97 and the two further conveyors corresponding thereto as well as conveyors 98, 99 and 100 are driven over chain transmissions from a take-off 101 on the drive shaft of return pulley 57. As earlier mentioned, this return pulley is driven on the opposite side of the threshing machine over a miter wheel gearing 63 from engine 44. The chain transmissions are not shown in order not to burden the figures unnecessarily with details that are readily realized in practice by those skilled in the art.

A conveyor 102 extending longitudinally of the threshing machine is arranged at the lower ends of conveyors 98, 99 and 100, and it receives the peas rolling down and conveys them rearwardly to a bucket elevator 103 at the rear end of the threshing machine. Conveyor 102 passes over return pulleys 104 and 105, and elevator 103 passes over return pulleys 106 and 107. The upper pulley 106 of these latter pulleys is mounted on the same shaft as return pulley 85 and is driven together with it, while the lower pulley 107 is connected by a chain transmission 108 to the return pulley 104 of conveyor 102 to drive said conveyor 102.

All cylinders, rotary spiders and conveyors as well as the impeller 18 are thus driven by the engine 44 so that these movable parts can be driven at a suitable constant speed independently of the travelling speed of the threshing machine. Engine 44 can drive the pick-up device 17 also but as this device shall be in operation only when the threshing machine is propelled and as its speed should be adapted to the travelling speed of the threshing machine, it is more advantageous to drive the pick-up device from engine 13, as is shown in FIG. 1, where a gear box 109 driven by engine 13 is connected over a chain transmission 110 to the pick-up device.

It will be obvious to those skilled in the art that various modifications may be made without leaving the scope of the invention both in respect of the design and arrangement of the threshing elements and in respect of the construction of the conveying and separating means, and it will also be obvious that the threshing machine can be provided as a stationary machine.

What we claim and desire to secure by Letters Patent is:

1. In a threshing machine for leguminous plants, particularly peas, the combination comprising a plurality of threshing cylinders provided with beaters, means mounting said threshing cylinders in a row with their rotational axes transversely spaced and substantially parallel and horizontal, means for rotating said threshing cylinders in the same relative direction of rotation, a plurality of concaves, one for each threshing cylinder, means mounting said concaves above said threshing cylinders for cooperation therewith, a perforated endless belt conveyor, means mounting said belt conveyor with a carrying run thereof beneath said threshing cylinders and close to them and extending throughout the length of said threshing cylinders in a plane substantially parallel with the rotational axes of said threshing cylinders longitudinal upstanding flexible ribs on the surface of said belt conveyor in said carrying run facing said threshing cylinders, said perforated belt conveyor having holes between said ribs, said concaves and said conveyor defining together a passage for the material to be threshed by the cylinders disposed in said passage, means for supplying said material at one end of said passage, means for delivering said material after being threshed, at the other end of said passage, and means for driving said belt conveyor in a direction of said carrying run that is opposed to the peripheral direction of rotation of said threshing cylinders adjacent said carrying run.

2. The combination as claimed in claim 1 where said soles are arranged in longitudinal rows and extend to the bases of said ribs.

3. The combination as claimed in claim 2 in which said holes are elongated longitudinally of the ribs.

4. The combination as claimed in claim 1 comprising groups of longitudinal upstanding flexible ribs on the surface of said belt conveyor in said carrying run facing said threshing cylinders, said groups being separated by portions of said belt conveyor which are free of ribs, said belt conveyor forming longitudinal rows of holes between the ribs, said holes extending to the bases of the ribs.

References Cited by the Examiner
UNITED STATES PATENTS

| | | | |
|---|---|---|---|
| 433,302 | 7/90 | Paci | 130—30 |
| 795,498 | 7/05 | Empson | 130—30 |
| 2,139,029 | 12/38 | Miller | 130—30 |
| 2,308,367 | 1/43 | Johnson | 130—27.85 |
| 2,577,329 | 12/51 | Irvine | 130—27.11 |

ANTONIO F. GUIDA, *Primary Examiner.*

ARNOLD RUEGG, *Examiner.*